(12) United States Patent
Jacobs

(10) Patent No.: US 6,843,936 B1
(45) Date of Patent: Jan. 18, 2005

(54) GETTER FOR ENHANCED MICROMECHANICAL DEVICE PERFORMANCE

(75) Inventor: Simon Joshua Jacobs, Lucas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/416,910

(22) Filed: Oct. 13, 1999

Related U.S. Application Data

(60) Provisional application No. 60/105,269, filed on Oct. 22, 1998.

(51) Int. Cl.[7] .............................................. C09K 3/00
(52) U.S. Cl. ....................................................... 252/194
(58) Field of Search ................................. 252/194, 190

(56) References Cited

U.S. PATENT DOCUMENTS

| | | | | |
|---|---|---|---|---|
| 2,388,390 A | * | 11/1945 | Cook et al. ................... | 252/194 |
| 2,933,455 A | * | 4/1960 | Doying ........................ | 252/194 |
| 3,704,806 A | * | 12/1972 | Plachenov ................... | 206/204 |
| 4,295,994 A | * | 10/1981 | Kulprathipanja ............. | 502/62 |
| 4,337,171 A | * | 6/1982 | Kulprathipanja et al. ..... | 502/62 |
| 4,406,819 A | * | 9/1983 | Kulprathipanja et al. ..... | 502/79 |
| 4,426,769 A | * | 1/1984 | Grabbe ........................ | 29/832 |
| 5,061,049 A | | 10/1991 | Hornbeck ..................... | 359/224 |
| 5,078,909 A | * | 1/1992 | Shigeta et al. ............... | 252/194 |
| 5,244,707 A | | 9/1993 | Shores ......................... | 428/76 |
| 5,304,419 A | | 4/1994 | Shores ......................... | 428/355 |
| 5,331,454 A | | 7/1994 | Hornbeck .................... | 359/224 |
| 5,401,536 A | | 3/1995 | Shores ......................... | 427/294 |
| 5,583,688 A | | 12/1996 | Hornbeck .................... | 359/291 |
| 5,591,379 A | * | 1/1997 | Shores ......................... | 252/194 |
| 5,610,438 A | * | 3/1997 | Wallace et al. .............. | 257/682 |
| 5,939,785 A | | 8/1999 | Klonis et al. ................. | 257/729 |

FOREIGN PATENT DOCUMENTS

| | | | | |
|---|---|---|---|---|
| EP | 826822 A2 | * | 3/1998 | .......... D21H/17/68 |
| JP | 60129139 A | * | 7/1985 | ............ B01J/20/18 |

OTHER PUBLICATIONS

Translation of JP 60–129139 (Jul. 10, 1985), Matsuoka, et al.*

* cited by examiner

*Primary Examiner*—Matthew A. Thexton
(74) *Attorney, Agent, or Firm*—Charles A. Brill; Wade James Brady, III; Frederick J. Telecky, Jr.

(57) ABSTRACT

A desiccant compound, image projection system using the desiccant compound, and a method for utilizing the desiccant compound. The desiccant compound formed by mixing (202) a polymer binder selected from the group consisting of polysaccharides (including without limitation structural polysaccharides such as cellulose, chitin, and their functionalized derivatives), polyamines, polysulfones, and polyamides with a drying agent, typically a zeolite, at a polymer to drying agent weight ratio of 1:2.1 to 1:100, or 1:4 to 1:10. After the desiccant compound is mixed (202) it is applied (204) to a surface and cured (206), often through the application of heat and vacuum. The cured desiccant compound is conditioned (208) and the it package is sealed (210).

53 Claims, 1 Drawing Sheet

GETTER FOR ENHANCED MICROMECHANICAL DEVICE PERFORMANCE

This application claims priority under 35 USC § 119(e)(1) of provisional application No. 60/105,269 filed Oct. 22, 1998.

CROSS-REFERENCE TO RELATED APPLICATIONS

The following patents and/or commonly assigned patent applications are hereby incorporated herein by reference:

| Patent No. | Filing Date | Issue Date | Title |
| --- | --- | --- | --- |
| 5,061,049 | Sep. 13, 1990 | Oct. 29, 1991 | Spatial Light Modulator and Method |
| 5,331,454 | Jan. 16, 1992 | Jul. 19, 1994 | Low Voltage Reset Process for DMD |
| 5,583,688 | Dec. 21, 1993 | Dec. 10, 1996 | Multi-Level Digital Micromirror Device |
| 5,939,785 | Apr. 3, 1997 | Aug. 17, 1999 | Micromechanical Device Including Time-Release Passivant |
| 08/971,810 | Nov. 17, 1997 | | Monolayer Lubricant for Micromachines |
| 09/406,386 | Sep. 27, 1999 | | Surface Treatment Material Deposition and Recapture |

FIELD OF THE INVENTION

This invention relates to the field of getters or desiccant compounds, particularly to moisture and particulate getters for micromechanical devices and electronic enclosures.

BACKGROUND OF THE INVENTION

Electronic devices such as integrated circuits are often packaged in hermetically sealed enclosures. These enclosures protect the device from contaminants, particles, and water vapor that would otherwise enter the package and mechanically damage or electrically disrupt the device. The hermetic packages, however, do not perfectly seal out these elements over the life of the device. Additionally, some water vapor and debris is present in the enclosure cavity when the enclosure is sealed, or evolved by the packaging materials as the materials cure.

Getters, compounds that capture contaminants, moisture vapor, and particles, are included inside the device enclosures to trap these species and preclude degradation of device performance, thereby increasing the operational lifetime of the device. Various getter compounds are available depending on the environment to which the getter will be subjected.

Existing getter compounds are unsatisfactory for use with many modern micromechanical devices. Micromechanical devices are small structures typically fabricated on a semiconductor wafer using techniques such as optical lithography, doping, metal sputtering, oxide deposition, and plasma etching which have been developed for the fabrication of integrated circuits. Typical micromechanical devices include accelerometers, pressure sensors, micro-motors, and micromirrors.

Because of their small size, often less than 100 microns, micromechanical devices are very susceptible to damage from debris inside the micromechanical device package. For example, debris can easily obstruct the motion of, or electrically short-circuit, micromirror elements which are often no larger than 17 microns.

Many micromechanical devices include moving components that place unique demands on surface lubrication and passivation systems. For example, the deflectable element of a micromirror device rotates about a torsion beam hinge axis and is stopped by contact with a landing zone or spring structure. The contact point experiences metal-to-metal contact and some scrubbing action. This metal-to-metal contact can create sticking and friction (stiction) between the moving components. Stiction is caused by the capillary action of water vapor present on the surface, van der Waals attraction, and intermetallic bonding of the metals. Stiction becomes worse as the contacting surfaces wear against each other since the contact area is increased.

Passivation coatings on micromirror devices reduce stiction and wear between the contacting surfaces. One passivation material that is especially useful for micromirror devices is a perfluoroalkanoic acid such as perfluorodecanoic acid (PFDA). PFDA, as taught by U.S. Pat. No. 5,331,454, issued Jul. 19, 1994 and entitled Low Voltage Reset for DMD, provides an oriented monolayer on the surfaces of the DMD. The oriented monolayer provides a chemically inert surface that reduces the stiction between adjacent metal parts.

Unfortunately, the PFDA forms a relatively weak bond between with the aluminum surfaces on which it is deposited. Because of the weak bond between the PFDA and the aluminum surfaces of the micromirror device, the scrubbing action between contacting parts wears the oriented monolayer and exposes the underlying aluminum. Without replenishment, exposed aluminum regions grow and eventually create unacceptably large stiction forces—ruining the device. Additional PFDA, however, cannot simply be included in the package since the excess PFDA will condense in crystalline form on the working surfaces of the device, thereby forming particles that obstruct the free operation of the device and causing catastrophic device failure. What is needed is a method and system of replenishing the passivation layer on the micromechanical device while trapping water vapor present in the package that does not introduce particulate PFDA into the package.

SUMMARY OF THE INVENTION

Objects and advantages will be obvious, and will in part appear hereinafter and will be accomplished by the present invention which provides a method and system for a getter, or desiccant compound, for enhanced micromechanical device performance. One embodiment of the claimed invention provides a desiccant compound able to reversibly absorb a carboxylic acid passivation material. The desiccant compound comprises a polymer binder selected from the group consisting of polysaccharides (including structural polysaccharides such as cellulose, chitin, their functionalized derivatives, and others well known to practitioners of the art), polyamines, polyamides, and polysulfones, and a drying agent dispersed in the binder. The polymer to drying agent weight ratio is 1:2.1 to 1:100. According to another embodiment, the polymer to drying agent weight ratio is 1:4 to 1:10. According to one embodiment, the drying agent typically is a zeolite such as a molecular sieve.

According to one embodiment, the desiccant compound further comprises a solvent. The weight ratio of the combined polymer and drying agent to the solvent is 2:1 to 1:100, or optionally 1:1 to 1:10. By application of such a formulation followed by evaporation of the solvent (curing), a dry desiccant compound is obtained having a polymer to drying agent weight ratio of 1:2.1 to 1:100. It is understood that some traces of solvent may remain after the curing process. This curing process may occur at room or elevated temperature, with or without a vacuum to assist in removing the solvent.

According to one embodiment the polymer is hydroxypropylcellulose. According to another embodiment the polymer is poly(vinylpyrrolidone). According to yet another embodiment, the polymer is poly(2-vinylpyridine), poly(4-vinylpyridine), or a copolymer of 2-vinylpyridine and 4-vinylpyridine. According to yet another embodiment the compound further comprises a carboxylic acid passivation material such as a perfluoroalkanoic acid, for example perfluorodecanoic acid absorbed by said polymer.

The disclosed invention also provides a device comprising a micromechanical machine, a package enclosing the micromechanical machine, and a desiccant compound able to reversibly absorb a carboxylic acid passivation material enclosed by said package. The desiccant compound comprises a polymer binder selected from the group consisting of polysaccharides, polyamines, polyamides, and polysulfones and a drying agent dispersed in said binder at a polymer to drying agent weight ratio of 1:2.1 to 1:100.

According to another embodiment of the disclosed invention, a method of applying a desiccant compound able to reversibly absorb a carboxylic acid passivation material is disclosed. The method comprising the steps of: mixing the desiccant compound, applying the desiccant compound to a surface, curing the desiccant compound, and conditioning the desiccant compound by allowing the desiccant compound to absorb a carboxylic acid passivation material. The desiccant compound formed by mixing a polymer binder selected from the group consisting of polysaccharides, polyamines, polyamides, and polysulfones with a drying agent at a polymer to drying agent weight ratio of 1:2.1 to 1:100.

According to another embodiment the cured desiccant compound is conditioned by heating the desiccant compound in the presence of a vacuum and exposing the desiccant compound to the carboxylic acid passivation material.

According to another embodiment the cured desiccant compound is heated in the presence of a vacuum and subsequently sealed inside a device containing a solid passivation material such as PFDA that has been delivered by any other method. Heating of the sealed device causes the passivant to be absorbed by the getter material in situ.

According to yet another embodiment of the disclosed invention, an image projection system is disclosed. The image projection system comprises a light source providing a beam of light along a light path, a micromirror on the light path, the micromirror device selectively reflecting portions of the beam of light in response to image data and control signals, and projection optics receiving the selectively reflected portions of the beam of light and focusing the selectively reflected portions of the beam of light onto an image plane. The micromirror device in the projection system comprising, a micromechamical machine; a package enclosing the micromechanical machine, and a desiccant compound enclosed by the package. The desiccant compound is able to reversibly absorb a carboxylic acid passivation material. The desiccant compound comprising a polymer binder selected from the group consisting of polysaccharides, polyamines, polyamides, and polysulfones and a drying agent dispersed in the binder at a polymer to drying agent weight ratio of 1:2.1 to 1:100.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
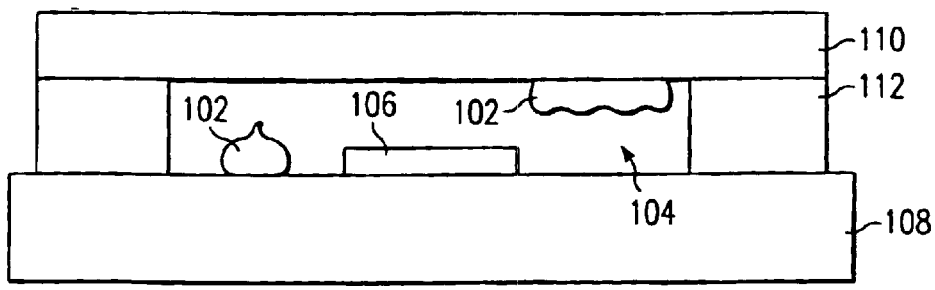
FIG. 1 is a cross-section view of a packaged micromechanical device showing the presence of a desiccant compound providing a reversible source/sink for a surface treatment and a gettering function.

A novel getter, or desiccant, compound and method is disclosed. The disclosed getter, or desiccant, compound 102, shown in FIG. 1, performs a desiccation function as well as providing a reversible source/sink of passivation material in a headspace 104 in which a micromechanical device 106 is enclosed. While the following description describes its use with a PFDA surface treatment material and micromirror device, these examples are for illustration purposes and in no way limit the intended scope of the disclosed invention. The disclosed technology is ideal for any micromechanical device used with an acidic passivant.

The disclosed desiccant compound has two primary components, a polymer and a drying agent. The polymer acts as both a source and a sink for the surface passivation material, and holds the drying agent in place. The drying agent absorbs water vapor present in the enclosure.

Several classes of polymers are available for use in the disclosed desiccant compound. The preferred polymers react with the carboxylic acid passivant available in the package headspace to regulate the amount of passivant vapor available in the package headspace. Specific examples of polymers include polysaccharides (including structural polysaccharides such as cellulose, hydroxypropylcellulose, chitin, their functional derivatives, and others well known to practitioners of the art), polyamines such as poly(2-vinylpyridine), poly(4-vinylpyridine), copolymers of 2-vinylpyridine and 4-vinylpyridine, polyamides such as poly(vinylpyrrolidone), and polysulfones such as poly(p-phenylene sulfone).

Polymers such as polysaccharides, polyamines, polyamides, and polysulfones are basic in nature. Although the conjugate acids of these polymers may have very low $pk_a$ values, their base strengths are sufficient to allow a Brønsted acid-base interaction with the envisioned passivants. The passivation materials envisioned, PFDA and similar carboxylic acids, are acidic. This allows the polymer and passivation material to interact through an acid-base reaction. When acting as a sink for the passivation material, the polymer accepts a proton from a gas phase carboxylic acid, thereby absorbing the carboxylic acid.

The absorbed carboxylic acid can later be released intact by deprotonation of the polymer. Thus, the polymer is a significant source of carboxylic acid passivation materials. Through the constant protonation/deprotonation of the polymer, an equilibrium passivation material vapor pressure is established and maintained in the package headspace. The passivation material vapor reacts with the surfaces of the micromechanical device to replenish the oriented monolayer as it is worn away by contact between components of the micromechanical device.

In addition to providing a reversible source/sink for the passivation material, the polymer provides a binder for the drying agent needed to capture water vapor in the package headspace. The drying agent typically is a molecular sieve, preferably a powdered hydrated aluminosilicate (zeolite) material. Water molecules enter the pores of the molecular sieve where they are adsorbed.

Molecular sieve drying agents are ideal for use in micromirror devices because the adsorbed water vapor is tightly bound to the sieve across a wide temperature range. Micromirror devices are exposed to very intense light. The light elevates the temperature of the micromirror device to well above 100° C. Molecular sieves retain the adsorbed water vapor at temperatures around 300° C. while many other drying agents tend to release the captured water vapor at temperatures above 100° C.

Since the polymer acts both as a binder and as a source/sink for the passivation material while the zeolite adsorbs water vapor, the polymer-zeolite mixture must provide enough polymer and zeolite to perform both functions. Typically, the zeolite-filled polymer desiccant compound has a polymer to zeolite weight ratio of 1:100 to 1:2.1 in order provide sufficient polymer and zeolite. Preferably, the polymer to zeolite weight ratio range is 1:10 to 1:4.

The polymer-zeolite mixture may be mixed with a suitable carrier solvent prior to being dispensed onto the package or window. A suitable solvent is one that dissolves the host polymer and evaporates without leaving harmful residue. A 2:1 to 1:100 solid to solvent weight ratio typically is used. Preferably, the solid to solvent weight ratio is 1:1 to 1:10.

Depending on the application, the polymer-zeolite mixture 102 is extruded onto a package substrate 108, a package lid or window 110, or a spacer ring 112. The mixture 102 is applied in dots, strips, or any other shape or form that does not interfere with the operation of the it device. For example, if the mixture is applied to the package window 110 it must be kept clear of the aperture through which light must pass. If desired, the polymer-zeolite mixture is applied directly to a surface enclosed by the package headspace without the use of a solvent.

Figure 2:
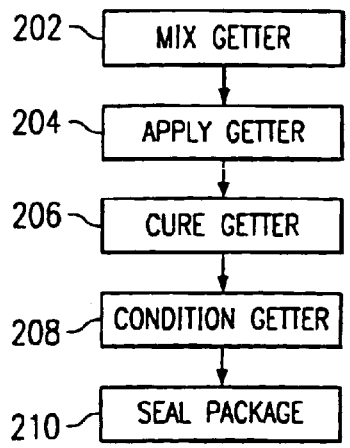
FIG. 2 is a flow chart of the process of mixing, applying, curing, and conditioning the desiccant compound shown in FIG. 1.

FIG. 2 is a flowchart showing the steps of applying the polymer-zeolite mixture. The polymer, zeolite, and a solvent if necessary, are mixed in step 202 and applied to a package surface in step 204. The polymer-zeolite mixture is cured in step 206. The cure process 206 is preferably performed at an elevated temperature and in the presence of a vacuum in order to remove all traces of solvent from the polymer-zeolite mixture. Alternatively, the cure process 206 is performed at room temperature.

After the polymer-zeolite mixture is cured, it is conditioned in step 208 to set the initial moisture content of the zeolite mixture. The conditioning step 208 typically comprises heating the polymer-zeolite mixture in the presence of a vacuum to remove as much water vapor from the zeolite as possible.

The conditioning step 208 may also expose the polymer-zeolite mixture to PFDA vapor. As described above, PFDA from the vapor is absorbed by the polymer to pre-load the polymer. Once the polymer is saturated with PFDA the package is sealed as indicated by step 210. Alternatively, solid PFDA is deposited in the package by other means, and the package sealed as indicated by step 210. After the sealing step, the package is heated, causing the solid PFDA to be absorbed by the desiccant compound.

Figure 3:
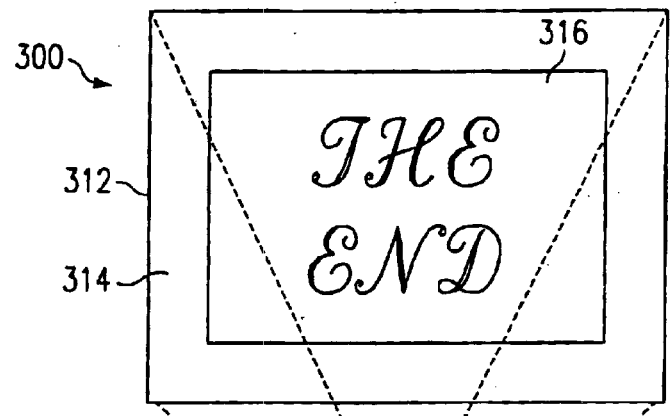
FIG. 3 is a schematic view of a micromirror-based projection system utilizing the improved micromechanical device of FIG. 1.

FIG. 3 is a schematic view of an image projection system 300 using an improved micromirror 302 according to the present invention. In FIG. 8, light from light source 304 is focused on the improved micromirror 302 by lens 306. Although shown as a single lens, lens 306 is typically a group of lenses and mirrors which together focus and direct light from the light source 304 onto the surface of the micromirror device 302. Image data and control signals from controller 314 cause some mirrors to rotate to an on position and others to rotate to an off position. Mirrors on the micromirror device that are rotated to an off position reflect light to a light trap 308 while mirrors rotated to an on position reflect light to projection lens 310, which is shown as a single lens for simplicity. Projection lens 310 focuses the light modulated by the micromirror device 302 onto an image plane or screen 312.

Thus, although there has been disclosed to this point a particular embodiment for a getter, or desiccant compound, for enhanced performance of micromechanical devices and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A desiccant comprising:
   a polymer binder selected from the group consisting of poly(vinylpyrrolidone), poly(2-vinylpyridine), poly(4-vinylpyridine), and copolymers of 2-vinylpyridine and 4-vinylpyridine;
   a drying agent dispersed in said binder; and
   said polymer to drying agent weight ratio being 1:2.1 to 1:100.

2. The desiccant of claim 1, wherein said drying agent is a molecular sieve.

3. The desiccant of claim 1, wherein said drying agent is a zeolite.

4. The desiccant of claim 1, said polymer to said drying agent weight ratio being 1:4 to 1:10.

5. The desiccant of claim 1, further comprising:
   a solvent, said polymer and said drying agent to solvent weight ratio being 2:1 to 1:100.

6. The desiccant of claim 1, said desiccant able to reversibly absorb a carboxylic passivation material.

7. A desiccant comprising:
   a polymer binder selected from the group consisting of polysaccharides, polyamines, and polyamides;
   a drying agent dispersed in said binder;
   a carboxylic acid passivation material, said carboxylic acid passivation material absorbed by said polymer; and
   said polymer to drying agent weight ratio being 1:2.1 to 1:100.

8. The desiccant of claim 7, wherein said polymer is a structural a polysaccharide.

9. The desiccant of claim 7, wherein said polymer is selected from the group consisting of cellulose, hydroxypropylcellulose, chitin, and their functional derivatives.

10. The desiccant of claim 7, wherein said polymer is poly(vinylpyrrolidone).

11. The desiccant of claim 7, wherein said polymer is selected from the group consisting of poly(2-vinylpyridine), poly(4-vinylpyridine), and copolymers of 2-vinylpyridine and 4-vinylpyridine.

12. The desiccant of claim 7; wherein said carboxylic acid passivation material is a perfluoroalkanoic acid.

13. The desiccant of claim 7, wherein said carboxylic acid passivation material is perfluorodecanoic acid.

14. The desiccant of claim 7, said desiccant able to reversibly absorb a carboxylic passivation material.

15. A device comprising:
   a micromechanical machine;
   a package enclosing said micromechanical machine; and
   a desiccant enclosed by said package, said desiccant comprising:
      a polymer binder selected from the group consisting of polysaccharides, polyamines, and polyamides;
      a drying agent dispersed in said binder; and
      said polymer to drying agent weight ratio being 1:2.1 to 1:100.

16. The device of claim 15, wherein said drying agent is a molecular sieve.

17. The device of claim 15, wherein said drying agent is a zeolite.

18. The device of claim 15, said polymer to said drying agent weight ratio being 1:4 to 1:10.

19. The device of claim 15, further comprising:
   a solvent, said polymer and said drying agent to solvent weight ratio being 2:1 to 1:100.

20. The device of claim 15, wherein said polymer is a structural polysaccharide.

21. The device of claim 15, wherein said polymer is selected from the group consisting of cellulose, hydroxypropylcellulose, chitin, and their functional derivatives.

22. The device of claim 15, wherein said polymer is poly(vinylpyrrolidone).

23. The device of claim 15, wherein said polymer is selected from the group consisting of poly(2-vinylpyridine), poly(4 vinylpyridine), and copolymers of 2-vinylpyridine and 4-vinylpyridine.

24. The device of claim 15, further comprising:
   a carboxylic acid passivation material, said carboxylic acid passivation material absorbed by said polymer.

25. The device of claim 24, wherein said carboxylic acid passivation material is a perfluoroalkanoic acid.

26. The device of claim 24, wherein said carboxylic acid passivation material is perfluorodecanoic acid.

27. The device of claim 15, said desiccant able to reversibly absorb a carboxylic passivation material.

28. A method of applying a desiccant, said method comprising the steps of:
   mixing said desiccant, said mixing comprising mixing:
      a polymer binder selected from the group consisting of polysaccharides, polyamines, and polyamides; and
      a drying agent dispersed in said binder, said polymer to drying agent weight ratio being 1:2.1 to 1:100;
   applying said desiccant to a surface; and
   curing said desiccant.

29. The method of claim 28, further comprising the step of:
   conditioning said desiccant by allowing said desiccant to absorb a carboxylic acid passivation material.

30. The method of claim 28, further comprising the step of:
   conditioning said desiccant by allowing said desiccant to absorb a perfluoroalkanoic acid passivation material.

31. The method of claim 28, further comprising the step of:
   conditioning said desiccant by allowing said desiccant to absorb a perfluorodecanoic acid passivation material.

32. The method of claim 28, said curing step comprising heating said desiccant in the presence of a vacuum.

33. The method of claim 29, said conditioning step comprising heating said desiccant in the presence of a vacuum.

34. The method of claim 29, said conditioning step comprising the steps of:
   heating said desiccant in the presence of a vacuum; and
   exposing said desiccant to said carboxylic acid passivation material.

35. The method of claim 29, said conditioning step comprising the steps of:
   heating said desiccant in the presence of a vacuum; and
   depositing said carboxylic acid passivation material in solid form directly in a package; and
   sealing said package; and
   heating said package so that said carboxylic acid passivation material is absorbed into said desiccant.

36. The method of claim 28, said mixing step comprising the step of mixing:
   a polymer binder selected from the group consisting of polysaccharides, polyamines, and polyamides;
   a drying agent dispersed in said binder, said polymer to drying agent weight ratio being 1:2.1 to 1:100; and
   a solvent, wherein said polymer and said drying agent to solvent weight ratio is 2:1 to 1:100.

37. The method of claim 28, said mixing step comprising the step of mixing:
   a polymer binder selected from the group consisting of polysaccharides, polyamines, and polyamides;
   a drying agent dispersed in said binder, said polymer to drying agent weight ratio being 1:2.1 to 1:100; and
   a solvent, wherein said polymer and said drying agent to solvent weight ratio is 1:1 to 1:10.

38. The method of claim 28, said mixing step comprising the step of mixing:
   as polysaccharide; and
   a drying agent dispersed in said binder, said structural polysaccharide to drying agent weight ratio being 1:2.1 to 1:100.

39. The method of claim 28, said mixing step comprising the step of mixing:
   a polymer selected from the group consisting of cellulose, hydroxypropylcellulose, chitin, and their functional derivatives; and
   a drying agent dispersed in said binder, said polymer to drying agent weight ratio being 1:2.1 to 1:100.

40. The method of claim 28, said mixing step comprising the step of mixing:
   poly(vinylpyrrolidone); and
   a drying agent dispersed in said binder, said poly(vinylpyrrolidone) to drying agent weight ratio being 1:2.1 to 1:100.

41. The method of claim 28, said mixing step comprising the step of mixing:
a polymer selected from the group consisting of poly(2-vinylpyridine), poly(4-vinylpyridine), and copolymers of 2-vinylpyridine and 4-vinylpyridine; and
a drying agent dispersed in said binder, said polymer to drying agent weight ratio being 1:2.1 to 1:100.

42. An image projection system comprising:
a light source providing a beam of light along a light path;
a micromirror on said light path, said micromirror device selectively reflecting portions of said beam of light in response to image data and control signals, said micromirror device comprising:
a micromechanical machine;
a package enclosing said micromechanical machine; and
a desiccant enclosed by said package, said desiccant comprising:
a polymer binder selected from the group consisting of polysaccharides, polyamines, and polyamides;
a drying agent dispersed in said binder; and
wherein said polymer to drying agent weight ratio is 1:2.1 to 1:100 projection optics receiving said selectively reflected portions of said beam of light and focusing said selectively reflected portions of said beam of light onto an image plane.

43. The image projection system of claim 42, wherein said drying agent is a molecular sieve.

44. The image projection system of claim 42, wherein said drying agent is a zeolite.

45. The image projection system of claim 42, said polymer to said drying agent weight ratio being 1:4 to 1:10.

46. The image projection system of claim 42, wherein said polymer is a structural polysaccharide.

47. The image projection system of claim 42, wherein said polymer is selected from the group consisting of cellulose, hydroxypropylcellulose, chitin, and their functional derivatives.

48. The image projection system of claim 42, wherein said polymer is poly(vinylpyrrolidone).

49. The image projection system of claim 42, wherein said polymer is selected from the group consisting of poly(2-vinylpyridine), poly(4-vinylpyridine), and copolymers of 2-vinylpyridine and 4-vinylpyridine.

50. The image projection system of claim 42, said desiccant able to reversibly absorb a carboxylic passivation material.

51. The image projection system of claim 42, further comprising:
a carboxylic acid passivation material, said carboxylic acid passivation material absorbed by said polymer.

52. The image projection system of claim 51, wherein said carboxylic acid passivation material is a perfluoroalkanoic acid.

53. The image projection system of claim 51, wherein said carboxylic acid passivation material is perfluorodecanoic acid.

* * * * *